United States Patent

[11] 3,601,385

| [72] | Inventors | Louis Senter;<br>Robert E. Johnson, both of Los Angeles, Calif. |
|---|---|---|
| [21] | Appl. No. | 868,435 |
| [22] | Filed | Oct. 22, 1969 |
| [45] | Patented | Aug. 24, 1971 |
| [73] | Assignee | Whittaker Corporation |

[54] ATTACHMENT FOR CHANGING REAR END SUSPENSION IN AUTOMOBILES
7 Claims, 6 Drawing Figs.

[52] U.S. Cl. .................................................. 267/48
[51] Int. Cl. .................................................. B60g 1/02, B60g 11/04
[50] Field of Search .................................... 267/48, 52, 54, 55, 158, 160

[56] References Cited
UNITED STATES PATENTS

| 1,099,539 | 6/1914 | DeLaMonte | 267/48 |
| 1,621,532 | 3/1927 | Gates | 267/48 |
| 2,973,196 | 2/1961 | Scheublein, Jr. et al. | 267/48 |
| 3,227,436 | 1/1966 | Paioletti et al. | 267/48 |

*Primary Examiner*—Drayton E. Hoffman
*Attorneys*—Donald E. Nist and Jay H. Quartz ABSTRACT: Apparatus mountable on the rear axle of an automobile includes a platelike member to replace that plate element normally found on an automobile for clamping the central portion of the conventional leaf spring and for providing a support for the lower end of a conventional shock absorber. An arm pivotally mounted on such platelike member has one of its ends attached through a pivotal connection to the forwardmost part of the spring, the other end of such arm being releasably secured by a removable pin to a rearwardly extending extension of such platelike member so that the effect of the spring may be altered.

PATENTED AUG 24 1971 3,601,385
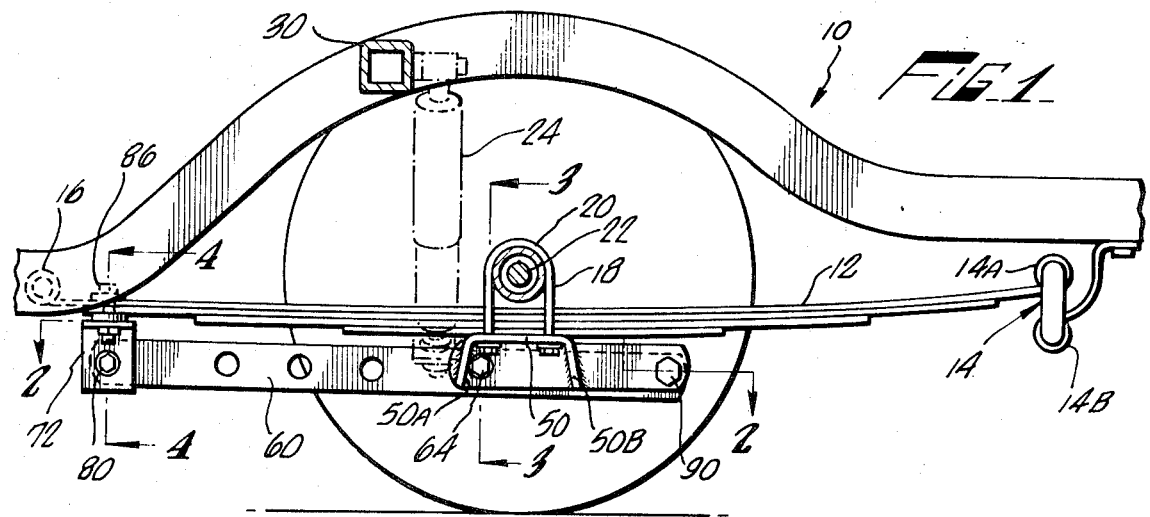
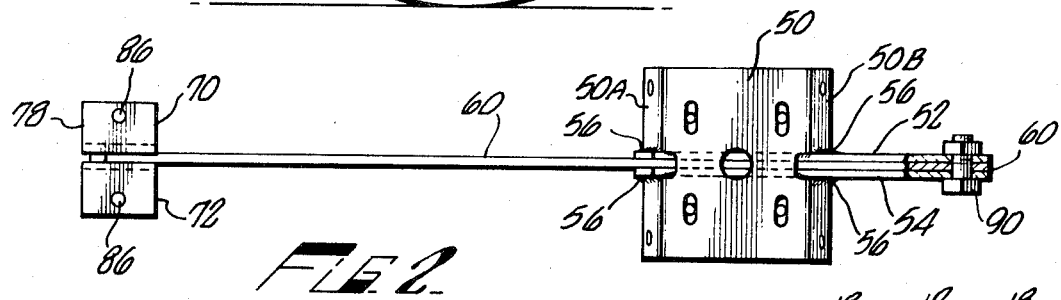
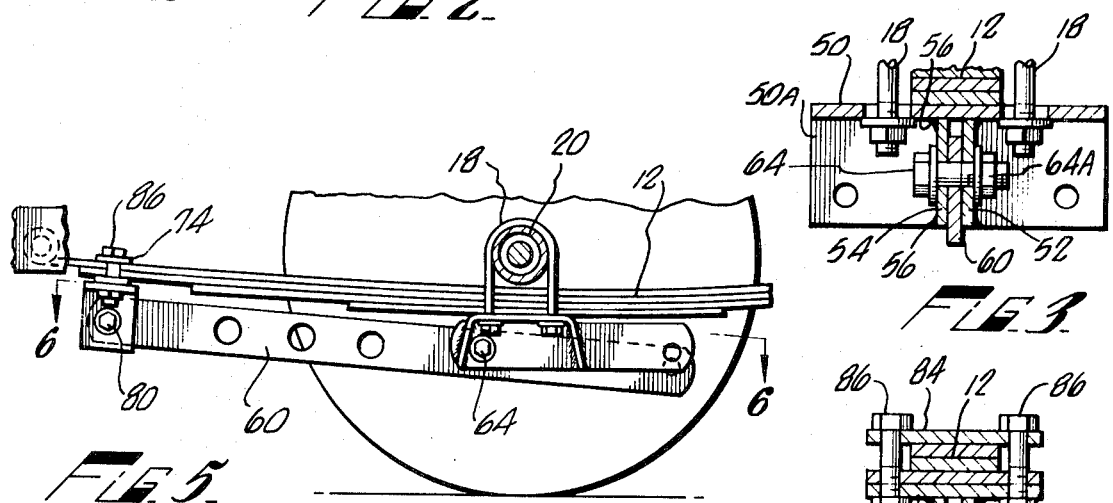
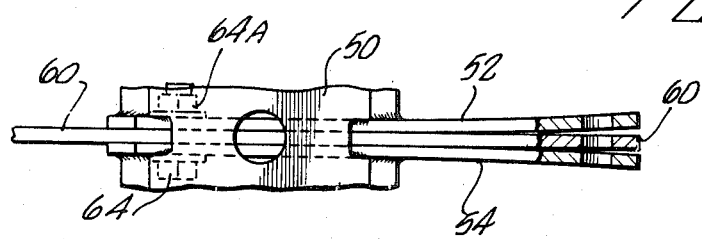
INVENTORS.
LOUIS SENTER
ROBERT E. JOHNSON
BY
Lyon+Lyon
ATTORNEYS.

ATTACHMENT FOR CHANGING REAR END SUSPENSION IN AUTOMOBILES

BACKGROUND OF THE INVENTION

The present invention relates to apparatus for changing the effect of a conventional automobile suspension system and is particularly useful for drag race participants who wish to "stiffen" the rear suspension system for improved racing starts. Stiffening of the rear leaf springs is required in drag racing to maintain the rear end of the vehicle in contact with the ground to maximize friction between the wheels and the ground to, in turn, obtain maximum acceleration. If such stiffening of the leaf spring is not employed, the downward force of the vehicle on the leaf spring during acceleration causes the forward end of the latter to warp or bend upwardly in wave fashion. This imparts a vertical force to the rear of the car causing it to bounce with the result that the wheels only intermittently contact the ground. In addition to a loss in acceleration, there is a substantial decrease in the control exerciseable by the driver over the direction taken by the vehicle.

The usual technique employed to stiffen the leaf springs is to add an auxiliary spring. While this provides some improvement, bouncing of the vehicle's rear end may still occur. Furthermore, the devices added by this technique are difficult both to connect and to remove from the leaf spring.

SUMMARY OF THE INVENTION

An object of the present invention is to provide apparatus for this purpose which when installed allows a person to readily change the effectiveness of an automobile's rear suspension system from a normal condition to a restrained condition and vice versa.

Another object of the present invention is to provide apparatus of this character which is easily installed and foolproof and effective in operation.

Another object of the present invention is to provide apparatus of this character which is particularly useful in eliminating so-called wheel-hop and spring wrap-up during rapid acceleration in, for example, drag racing.

Another object of the present invention is to provide apparatus of this character which need not be removed for normal street driving.

Another object of the present invention is to provide apparatus of this character which incorporates two pivot points to avoid or neutralize metal fatigue to thereby provide enhanced operation and more safe life.

Another object of the present invention is to provide apparatus of this character which provides substantially instant weight-transfer traction. The foregoing objects are accomplished by stiffening a vehicle's leaf springs by the combination of pivotally connecting one end of a rigid member to the leading end of the spring, pivotally connecting an intermediate point on the rigid member to the leaf spring under the vehicle's rear axle, and releasably connecting the other end of the rigid member to a second rigid member fixedly attached to the midway point of the spring. In contrast to prior art devices which use auxiliary springs for stiffening leaf springs, the advantages of this invention are obtained with rigid members assembled in a specific manner.

DESCRIPTION OF THE DRAWING

FIG. 1 is a view in side elevation of apparatus mounted on an automobile in accordance with features of the present invention with a releasable pin in operative position to impart rigidity to the suspension system.

FIG. 2 is a view taken as indicated by the line 2—2 in FIG. 1.

FIG. 3 is a view taken as indicated by the line 3—3 in FIG. 1.

FIG. 4 is a view taken as indicated by the line 4—4 in FIG. 1.

FIG. 5 is a view like FIG. 1 but with the releasable pin removed to allow the suspension system to operate with less rigidity.

FIG. 6 is a view taken as indicated by the line 6—6 in FIG. 5.

DESCRIPTION OF THE PREFERRED EMBODIMENT

The apparatus described is adapted to be mounted in identical fashion on each rear spring of a conventional automobile and for purposes of simplicity and brevity only one such apparatus is described associated with a corresponding spring.

The automobile 10 includes the conventional elliptical leaf-type spring 12, having its ends supported in conventional manner by rear shackle 14 and front shackle 16 with the central portion of such spring 12 being secured by U-bolts 18 to the wheel axle housing 20 which houses wheel axle 22. In conventional practice the ends of the U-bolts 18 pass through holes in a plate (not shown) which contacts the underside of the central portion of spring 12 and which also serves as a means to which the lower end of the conventional shock absorber 24 is fastened but in this instance such plate finds its counterpart or its substitute in the form of a generally U-shaped plate 50.

Such plate 50 thus serves as a clamping plate for clamping the novel apparatus to the central part of the spring and also for clamping the spring 12 to the axle housing 20 and also to provide a means whereby the lower end of the shock absorber 24 is secured, the upper end of the shock absorber being likewise secured in conventional manner on the automobile frame member 30.

Such plate 50 has the central portion of each of its downwardly extending legs 50A, 50B removed to accommodate a pair of parallel, spaced and rearwardly extending arms 52, 54 of flat plate stock, such arms being secured to plate 50 by welding material 56 at the leg portions 50A, 50B and also along the underside of plate 50 as seen in FIGS. 2 and 3.

These spaced platelike arms 52, 54 define an open channel or slot within which an elongated arm 60, also of flat plate stock, extends with an intermediate portion of such arm 60 being pivotally mounted on a pivot pin 64 which extends through such spaced arms 52, 54 and arm 60 and is threaded to receive a retaining nut 64A as seen in FIG. 3.

The forwardmost end of arm 60 is also pivotally secured to the adjacent portion of spring 12 using, for example, the construction shown in FIG. 4 wherein the arm 60 is between a pair of downwardly extending members 72, 74 which are secured by welding material 76 to the underside of clamping plate 78. A pivot pin 80 extends through aligned holes in elements 72, 60 and 74 and is secured by nut 82. The spring 12 is clamped between clamping plates 78 and 84 using clamping bolts 86. This or an equivalent means of connecting the leading end of the elongated arm 60 to the leaf spring is preferred since, as shown in FIG. 1, it minimizes the distance between the axis of the pivot pin 80 and the leaf spring 12. Minimizing this distance reduces the moment arm between the elongated arm 60 and the leaf spring so that the connecting means along this moment arm or the leaf spring itself is not broken during acceleration.

As seen in FIGS. 1 and 2, a removable fastening pin or bolt 90 extends through aligned holes in the rearmost extending ends of arms 52, 54 and arm 60 for purposes of increasing the rigidity of the spring suspension. With pin 90 in place there is no relative movement between arm 60 and plate 50 and hence that portion of spring 12 between axle housing 20 and that region where the leading end of arm 60 is attached to spring 12 is prevented from flexing in any substantial amount but some spring flexure of the rearwardmost portion of the spring 12 is permitted particularly since that portion of the spring is not constrained and the shackle has its ends free to pivot in its supporting bearing portions 14A, 14B.

When it is desired to eliminate this spring restraint, the pin 90 is removed and, as illustrated in FIGS. 5 and 6, the arm 60 is then free to move between the arms 52, 54 which may be somewhat transversely resilient to allow greater spacing from the arm 60 as also illustrated in FIG. 6. In this latter case the automobile suspension system operates in nearly normal fashion with pivotal movement of arm 60 being permitted about pivot pins 64 and 80. To use the spring stiffener of this invention, it is connected to the leaf springs of a vehicle as described herein and as shown in FIG. 6. The vehicle can be used for street use, but when needed for drag race use, it is only necessary to bring the plates 60, 52, 54 into alignment so that the removable pin 90 can be inserted in the aligned openings therethrough. In this condition, the vehicle can be raced. During racing acceleration, the wave motion which would be induced in the forward end of the leaf spring 12 except for the attachment of this invention to the leaf spring, is prevented from forming because the spring is stiffened between the rear axle 22 and the leading attachment point between the leading ends of the elongated arm 60 and leaf spring. The rear end of the vehicle is thereby held on the road. After racing is completed, the pin 90 is removed and the vehicle is again ready for road use.

While the particular embodiments of the present invention have been shown and described, it will be obvious to those skilled in the art that changes and modifications may be made without departing from the invention in its broader aspects and, therefore, the aim in the appended claims is to cover all such changes and modifications as fall within the true spirit and scope of this invention.

We claim:

1. Apparatus for stiffening a leaf spring of a vehicle, comprising:
   rigid plate means having a rearwardly extending arm;
   attachment means for fixedly attaching said rigid plate means to the underside of said leaf spring substantially midway between the ends of said leaf spring;
   rigid elongated arm means;
   first pivot means for pivotally connecting a point adjacent the forward end of said elongated arm means to a point adjacent the forward end of said leaf spring;
   second pivot means for pivotally connecting a point intermediate the ends of said elongated arm means to said rigid plate means adjacent said midway point of said leaf spring; and
   releasable means for releasably attaching a point on said elongated arm means rearward of said rigid plate means to said rearwardly extending arm of said rigid plate means.

2. The apparatus of claim 1 in which said rigid plate means having a rearwardly extending arm includes:
   a generally U-shaped plate having a pair of legs extending downwardly away from said leaf spring, each of said legs having a slot therein aligned with said slot in the other leg, said slots being aligned in a direction substantially paralleling the longitudinal axis of said leaf spring;
   a pair of plate arms extending rearwardly of said U-shaped plate through said pair of aligned slots and spaced apart to accommodate said elongated arm means therebetween;
   and means for fixedly attaching said plate arms to said U-shaped plates.

3. The apparatus of claim 2 in which said pair of plate arms are transversely resilient so that their rearward ends tend to move apart from each other when said releasable means is in a released condition.

4. The apparatus of claim 3 in which said releasable means is a pin which may be extended through aligned apertures in said elongated arm means and said plate arms rearward of said U-shaped plate.

5. The apparatus of claim 1 wherein said first pivot means is short to minimize the moment arm through said first pivot means between said leaf spring and said elongated arm means.

6. Apparatus for stiffening a rear leaf spring mounted under the rear axle of a vehicle and extending forwardly and rearwardly thereof for connection at its forward and rearward ends to the body of said vehicle through shackles connected thereto, said leaf spring being attached at its midpoint to said rear axle by U-bolts extending thereover, said apparatus comprising:
   a generally U-shaped plate mounted to the underside of said leaf spring by said U-bolts and having a pair of transverse legs extending downwardly away from said leaf spring, said transverse legs having generally vertical aligned slots therein, said slots aligned substantially parallel with the longitudinal axis of said leaf spring;
   a pair of plate arms extending rearwardly of said U-shaped plate through said aligned slots and spaced apart to accommodate the rearward end of said elongated arm therebetween;
   means for fixedly attaching said plate arms to said U-shaped plate;
   first pivot means for pivotally connecting a point adjacent the forward end of said elongated arm to said leaf spring adjacent said forward shackle, said pivot means having a length to minimize the moment arm through said pivot means between said leaf spring and said elongated arm;
   second pivot means for pivotally connecting a point intermediate the ends of said elongated arm to said plate arms adjacent the vertical plane through said rear axle; and
   releasable pin means for releasably connecting said elongated arm to said plate arms rearward of said U-shaped plate.

7. The apparatus of claim 6 wherein said means for fixedly attaching said plate arms to said U-shaped plate is a weld and said plate arms are transversely flexible to accommodate stress placed thereon by said weld.